United States Patent [19]

Gorney et al.

[11] Patent Number: 4,540,125
[45] Date of Patent: Sep. 10, 1985

[54] ROTARY SPRINKLER HAVING SELECTABLE AREA COVERAGE

[75] Inventors: Moshe Gorney, Kibbutz Naan; Michael Lerner, Rehov Tamar; Amos Shavit, Kibbutz Naan, all of Israel

[73] Assignee: Naan Mechanical Works, Kibbutz Naan, Israel

[21] Appl. No.: 485,891

[22] Filed: Apr. 18, 1983

[30] Foreign Application Priority Data

Apr. 18, 1982 [IL] Israel .................................. 65516

[51] Int. Cl.³ .............................................. B05B 3/08
[52] U.S. Cl. .................................. 239/232; 239/236; 239/230; 239/DIG. 1
[58] Field of Search ............................ 239/230–233, 239/236, 237, DIG. 1, 97

[56] References Cited

U.S. PATENT DOCUMENTS

| | | | |
|---|---|---|---|
| 3,464,628 | 9/1969 | Chow | 239/236 |
| 3,625,429 | 12/1971 | Turrell | 239/236 |
| 3,654,817 | 4/1972 | Kane | 239/236 |

Primary Examiner—Andres Kashnikow
Assistant Examiner—James R. Moon, Jr.
Attorney, Agent, or Firm—Cushman, Darby & Cushman

[57] ABSTRACT

A rotary sprinkler comprising a base, a stem mounted on the base for rotation relative thereto, the stem having an inlet for receiving a pressurized water supply, a water discharge nozzle mounted on the stem and being rotatable together therewith relative to the base, water driven drive apparatus for rotating the stem relative to the base, selectably positionable deflector apparatus for engaging a stream of water emitted by the nozzle for determining the maximum radius of the stream, and cam apparatus for operating the deflector apparatus and including manually settable cam apparatus for selecting an overall size and pattern of sprinkler stream coverage, and second cam apparatus for determining the desired sprinkling pattern as a function of the azimuthal orientation of the nozzle.

28 Claims, 28 Drawing Figures

ROTARY SPRINKLER HAVING SELECTABLE AREA COVERAGE

FIELD OF THE INVENTION

The present invention relates to rotary sprinklers for irrigation purposes and more particularly to rotary sprinklers capable of covering non-circular patterns.

BACKGROUND OF THE INVENTION

Rotary sprinklers capable of covering non-circular patterns are well known in the art and are constructed on the basis of a number of operational principles. Many of the sprinklers of this type employ a cam which operates a mechanism for governing the range of the spray as a function of the azimuthal angle of the nozzle with respect to a set of coordinates defined with respect to the sprinkler base.

One type of cam operated sprinklers employs a cam operated valve for governing the water flow to the sprinkler as a function of the azimuthal orientation of the nozzle. This type is exemplified in the following U.S. Pat. Nos. 2,824,765; 3,528,093; 3,878,990; 3,884,416; 2,739,839; 2,600,987; 4,119,275; 2,884,202; 3,881,655; 2,780,488. Another type of cam operated sprinkler employs a cam operated device for changing the angle of elevation of the nozzle. This type is exemplified by the following U.S. Pat. Nos.: 2,475,537; 3,952,954; 2,979,271; 3,960,327; 3,091,399.

Yet another type of cam operated sprinklers employs an auxiliary nozzle U.S. Pat. Nos. 2,835,529 and 2,459,244 illustrate such a construction.

Still another type of cam operated sprinklers employs a cam-operated deflector for producing a non-circular pattern. This type is exemplified by U.S. Pat. Nos. 4,191,331; 2,654,635; 3,654,817; 2,565,926.

Other patents of interest in this field, including patents which show apparatus for converting rotary sprinklers from part circle to whole circle operation include the following U.S. Pat. Nos.: 2,944,743; 3,841,563; 3,874,588; 3,924,809; 3,918,642; 3,921,912.

SUMMARY OF THE INVENTION

The present invention seeks to provide an improved type of rotary sprinkler which is capable of covering a non-circular pattern.

There is thus provided in accordance with an embodiment of the invention a rotary sprinkler comprising a housing arranged for connection to a pressurized water supply; a stem mounted in the housing for rotation relative thereto; a water discharge nozzle mounted on the extreme outer end of the stem and being rotatable together therewith relative to the housing; water driven drive apparatus for rotating the stem relative to the housing, selectably positionable deflector apparatus for engaging a stream of water emitted by the nozzle for determining the maximum radius of the stream, cam apparatus for operating the deflector apparatus and determining the maximum radius of the stream as a function of the azimuthal orientation of the nozzle, which function is determined by the cam, the cam apparatus comprising a first biasing device for determining the outer radius of a circle within which a desired pattern is to be defined and a second biasing device for defining the pattern within the circle.

Further in accordance with an embodiment of the present invention, the deflector apparatus comprises a water engaging portion and a cam following portion rigidly joined to the water engaging portion and is pivotably mounted about a pivot location. The pivot location is variable in accordance with the setting of the first biasing device.

Additionally in accordance with an embodiment of the present invention, the first biasing device is operative to govern the geometrical relationship between displacements of the cam following portion and the water engaging portion.

Further in accordance with an embodiment of the present invention, the first and second biasing devices are operated by a single dial which is rotatable relative the stem for setting thereof and is rotatable relative to the housing during operation of the sprinkler.

Additionally in accordance with an embodiment of the present invention, there is provided means for selectably limiting the azimuthal range of sprinkler rotation. According to a preferred embodiment of the invention, the limiting means comprise selectably displaceable protrusions whose orientations visually indicate the azimuthal range of sprinkler operation.

Further in accordance with an embodiment of the invention, apparatus is provided for preventing operation of the sprinkler in the undesired range of operation or in an undesired mode of operations.

Additionally in accordance with an embodiment of the present invention, the azimuthal limiting means are provided on concentric rings mounted onto the housing.

Additionally in accordance with an embodiment of the present invention, means are provided for selecting a non-circular pattern, such as a square pattern, and then rotating it as desired.

Further in accordance with an embodiment of the present invention, the pivot mounting location of the deflector apparatus is mounted on an intermediate link which is itself pivotably mounted at a location fixed with respect to the sprinkler stem.

Additionally in accordance with an embodiment of the invention, the cam following member may be operative to angle of the nozzle or to control the supply of liquid to the nozzle in response to a cammed program. These functions may be in combination with or in place of movement of the deflector into the nozzle output stream.

BRIEF DESCRIPTION OF THE DRAWINGS

The present invention will be more fully understood and appreciated from the following detailed description taken in conjunction with the drawings in which.

DETAILED DESCRIPTION OF THE INVENTION

Figure 1:
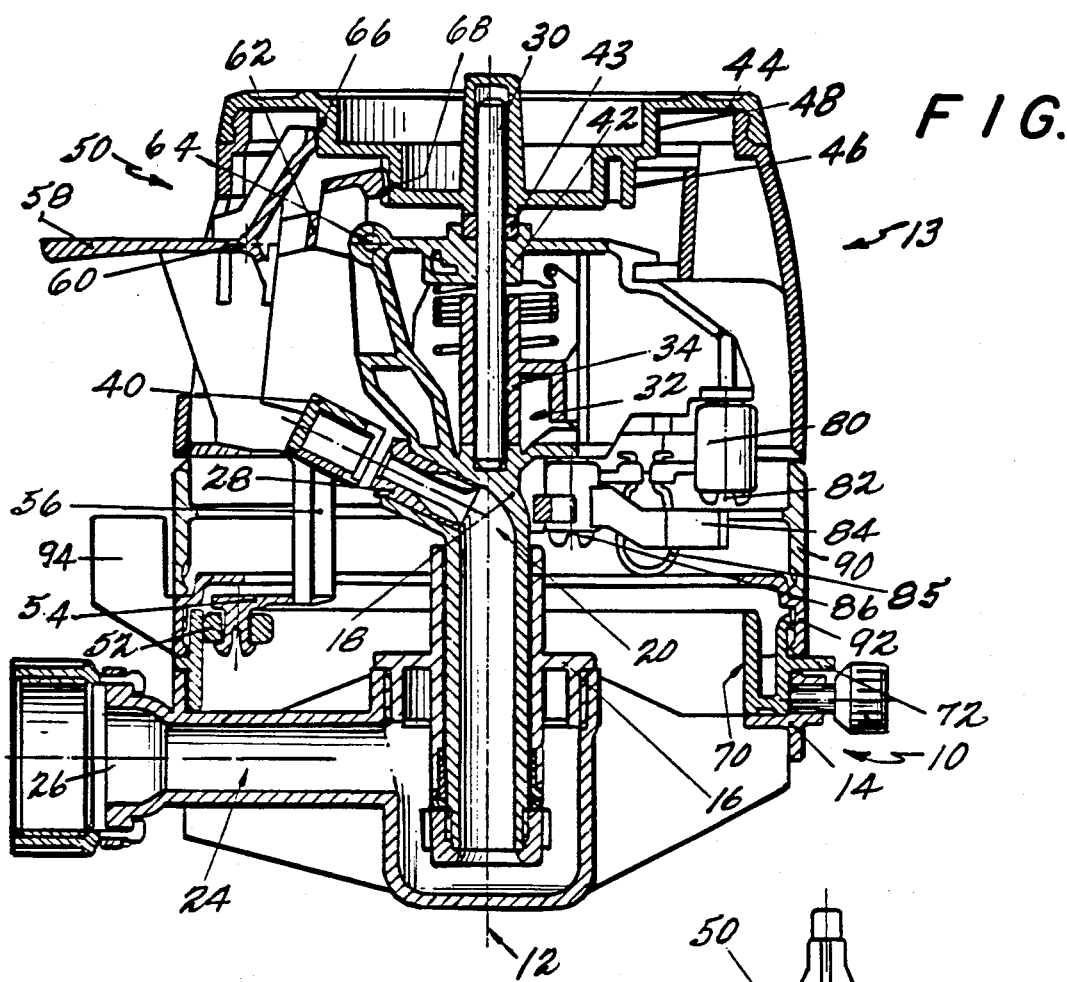
FIG. 1 is a sectional illustration of a rotary sprinkler constructed and operative in accordance with an embodiment of the present invention.
Figure 2:
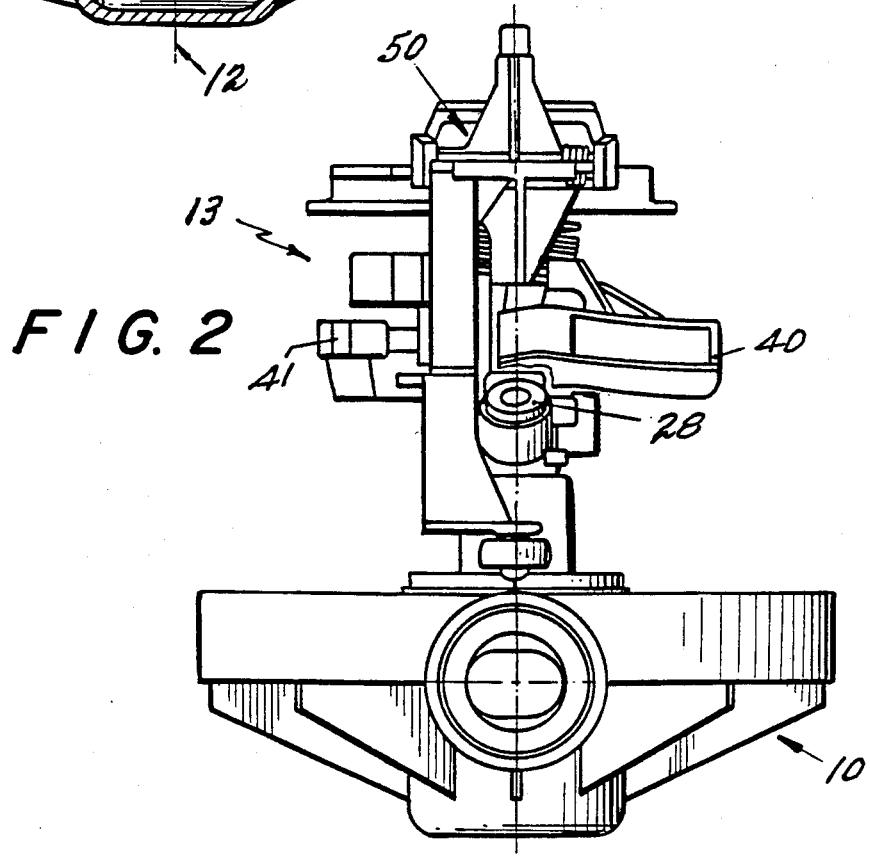
FIG. 2 is nozzle facing side view illustration of the sprinkler of FIG. 1, partially disassembled.
Figure 3:
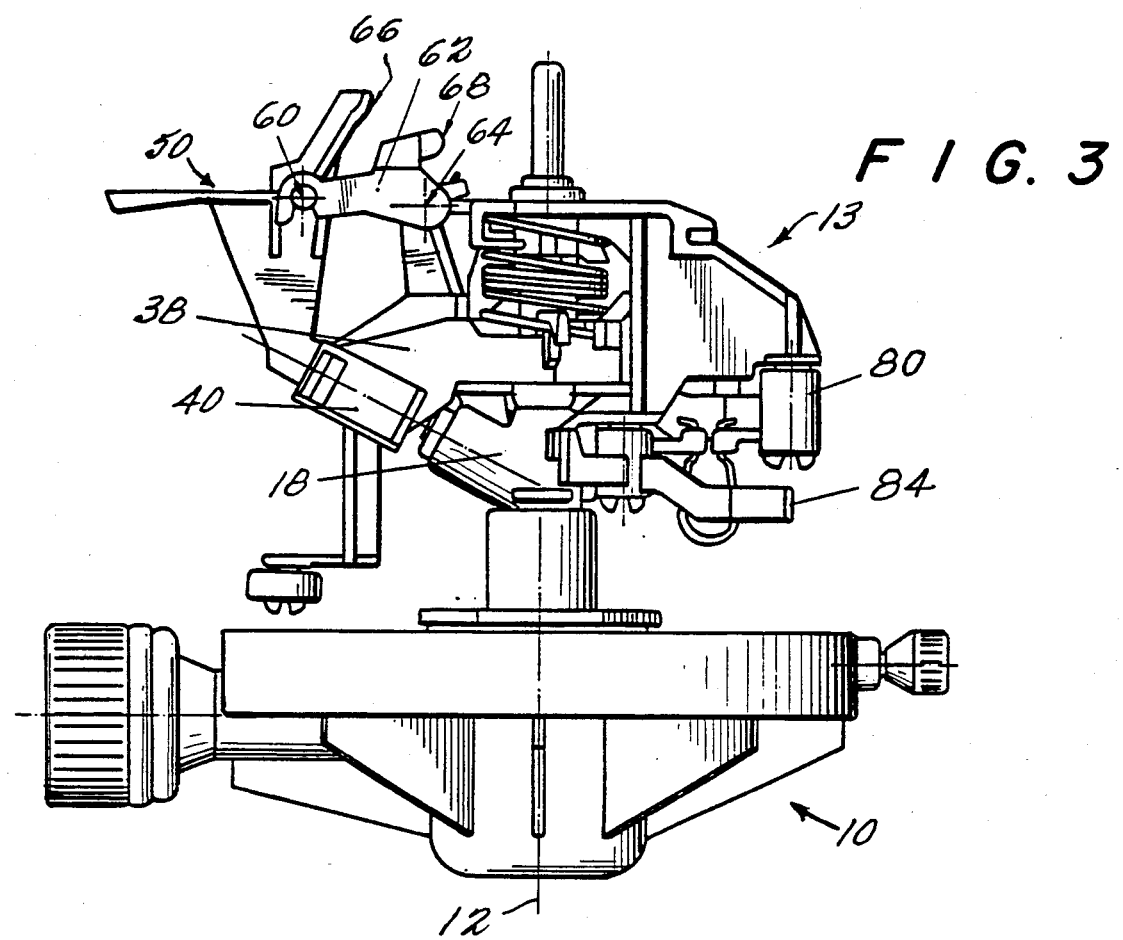
FIG. 3 is a hammer side facing side view corresponding to FIG. 2.
Figure 4:
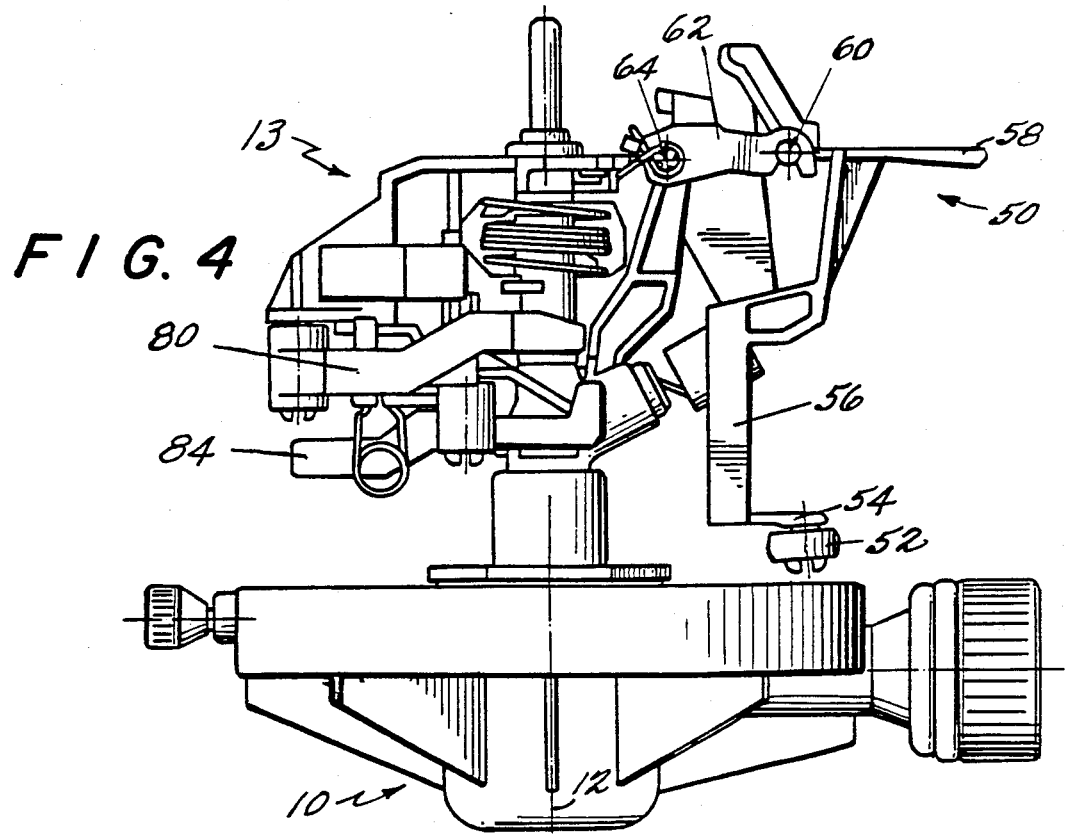
FIG. 4 is a cam follower side facing side view corresponding to FIGS. 2 and 3.
Figure 5:
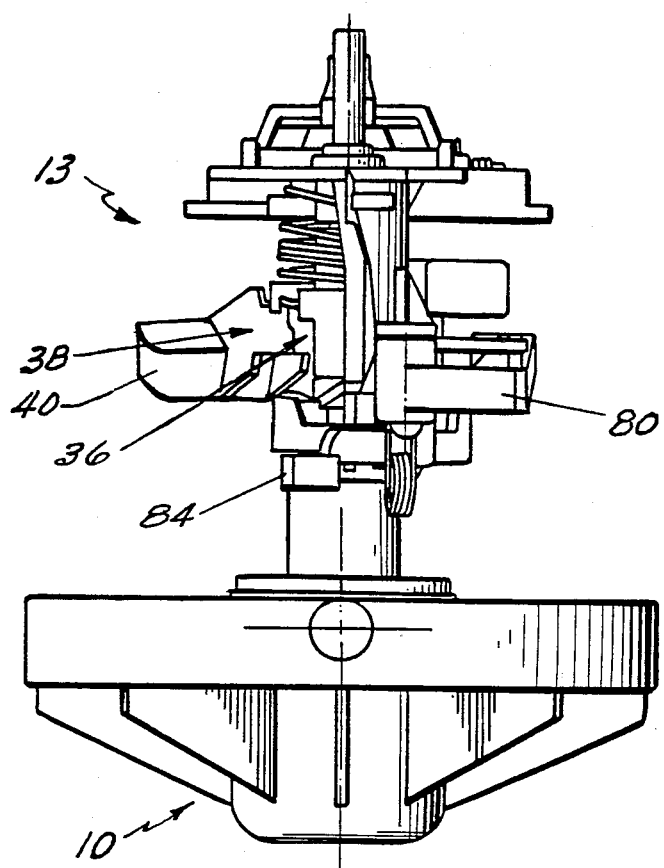
FIG. 5 is a rear side facing side view corresponding to FIGS. 2, 3 and 4.
Figure 6:
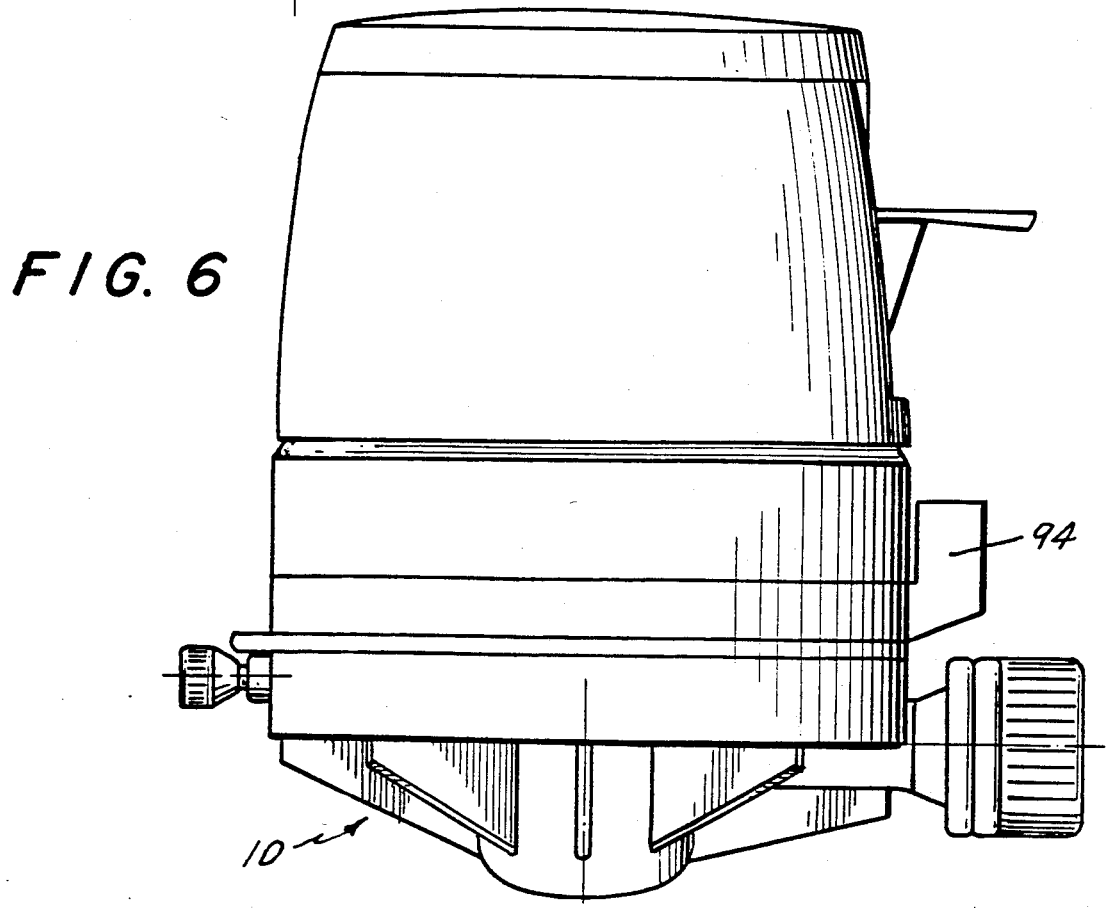
FIG. 6 is a side view of the fully assembled sprinkler corresponding in orientation to FIG. 4.

Reference is now made to FIGS. 1–8 which illustrate a sprinkler constructed and operative in accordance with an embodiment of the present invention. The sprinkler comprises a base 10, typically formed of plastic and which defines a generally vertical rotation axis 12 about which a sprinkler head 13 rotates.

Base 10 may be a unitary member or alternatively, as illustrated in the drawing, may be formed of a plurality of separate members. Base 10 may also be mounted onto a stabilizing basis member (not shown) of any type such as a wide base or a spike. The basis member may or may not include a water supply conduit. As a further alternative a lower portion 14 of the base 10 may be eliminated and a water supply connection may be made directly with an upper portion 16 of the base, by conventional techniques.

Rotatably mounted onto upper portion 16 for generally free rotation relative thereto about axis 12 is a stem block 18, also typically formed of plastic.

Stem block 18 defines a water passage channel 20 which communicates via a conduit 24 defined in lower portion 14 of base 10 with a water supply inlet 26. Channel 20 terminates in an angled nozzle portion 28. It is noted that although the present illustration shows nozzle portion 28 arranged at a fixed angle with respect to axis 12, it is also possible in an alternative embodiment of the invention to construct the nozzle portion to have a variable angular orientation with respect to axis 12. This alternative embodiment is desirable when it is desired to vary the angle of water ejection in accordance with a predetermined program in order to produce a particular sprinkler pattern.

An axial stem pin 30 is fixedly mounted onto stem block 18 and typically extends along axis 12, thus defining a bearing surface for the remaining elements of the sprinkler head 13, which are rotatable relative thereto.

Rotatably mounted about stem pin 30 is a hammer 32 including a collar portion 34 which surrounds pin 30. Connected to collar portion 34 is an intermediate portion 38. The intermediate portion 38 is connected at one end to a deflector 40, which defines a flow through pathway for water exiting under pressure from the nozzle portion 28, and at the opposite end to a weight 41. Preferably, the entire hammer 32 is formed integrally as a single plastic element.

Figure 7:
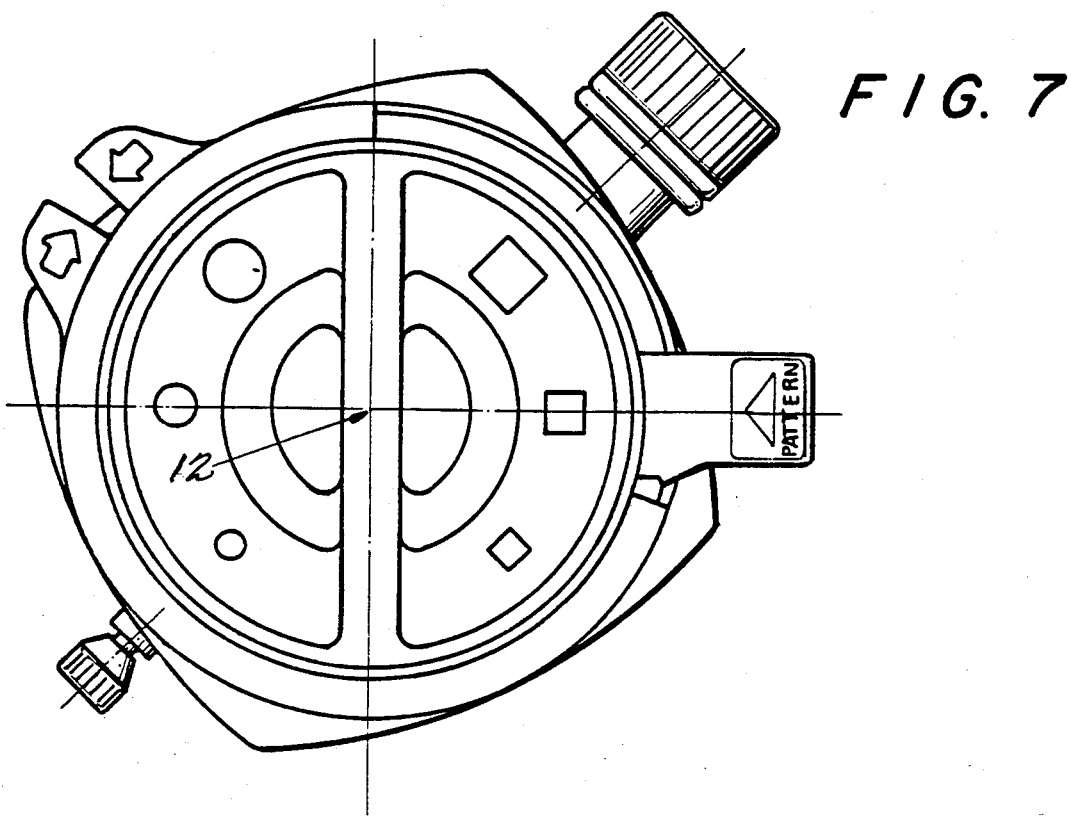
FIG. 7 is a top view of the fully assembled sprinkler of FIG. 6.
Figure 8:
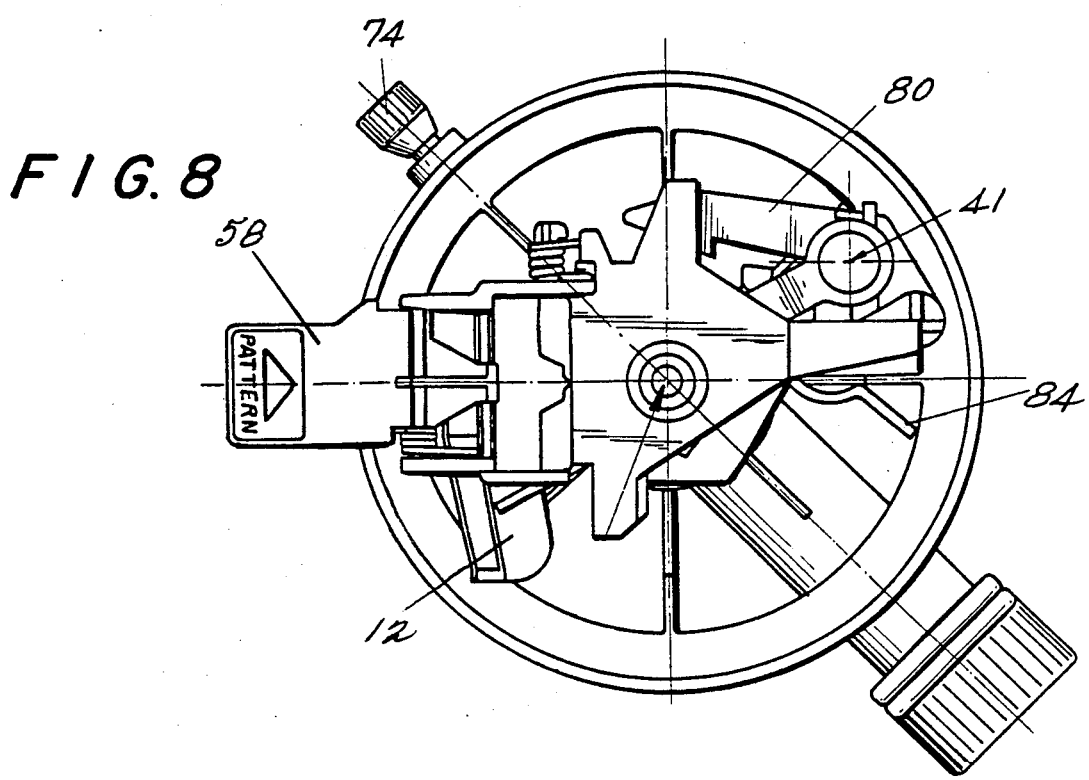
FIG. 8 is a top view of the sprinkler head of the preceding drawings.

Disposed in surrounding relationship with stem pin 30 above collar portion 34 is an extension 42 of stem block 18 which is preferably integrally formed therewith. Adjacent the top surface of extension 42 there is defined a spacer ring 43 which defines a bearing and rotating surface for a sprinkler radius defining cam member 44. Cam member 44 is integrally formed with a function selecting dial 45, whose face is illustrated in FIG. 7. The underside of cam member 44, which defines the cam surfaces, is illustrated in FIGS. 13A and 13B.

Figure 13A:
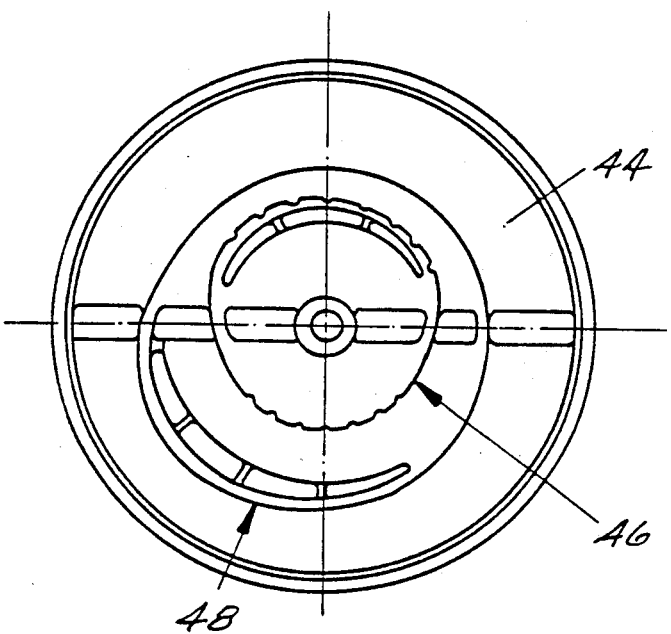
FIGS. 13A and 13B are respective plan view and sectional illustrations of a function governing cam member, the plan view illustrating the underside surface of the cam member, indicating the cam configurations thereon.
Figure 13B:
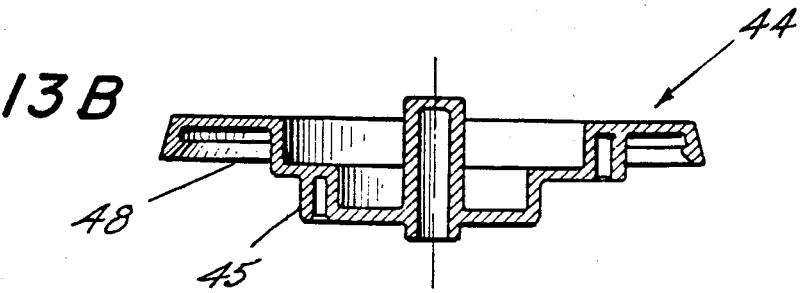

Referring briefly to FIGS. 13A and 13B, it is seen that the cam member 44 defines first and second cam surfaces 46 and 48. Both of the first and second cam surfaces 46 and 48 are typically defined as peripheral edge surfaces, it being appreciated that other types of cam surfaces may alternatively be provided. First cam surface 46 is preferably a toothed surface for precise positioning, while cam surface 48 is typically a smooth surface. As will be explained hereinafter in greater detail, first cam surface 46, of relatively small circumference, is used to selectably position a portion of a deflector assembly for non-circular pattern operation and the second cam surface 48 is used to selectably position a portion of the deflector assembly for circular pattern operation.

The deflector assembly will now be described in detail. The deflector assembly, indicated generally by reference numeral 50, comprises a pattern defining cam follower 52, typically embodied in a roller which is rotatably mounted onto a support arm 54, which in turn defines a perpendicular extension of a cam follower support arm 56. Cam follower support arm 56 is rigidly mounted onto a deflector 58 which is configured to engage from above a stream of water issuing from nozzle portion 28. It is appreciated that elements 54, 56, and 58 define a rigid unit and may be formed unitarily.

Deflector 58 is pivotably mounted at a pivot location 60 onto an intermediate member 62, which is itself pivotably mounted at a pivot location 64 onto stem block 18. It may thus be appreciated that the pivot location 60 is movable with respect to the base, nozzle portion and stem block. Normally pivot location 60 lies above the the water stream exiting from the nozzle portion. Alternative designs wherein this is not the case are also possible.

It is noted that deflector 58 is formed with a radially inward facing surface 66 which engages the second cam surface 48, while intermediate member 62 is formed with a radially inward facing surface 68 which engages the first cam surface 46. It may be appreciated that engagement of surface 68 of the intermediate surface with the first cam surface changes the angular relationship between the cam follower 52 and the deflector 58, while the the engagement of surface 66 of the deflector with second cam surface 48 is operative to pivot the deflector about pivot location 60 and thus to determine whether the cam follower 52 is in engagement with a pattern defining cam.

The pattern defining cam is provided, in accordance with a preferred embodiment of the present invention on the inside circumferential surface 70 of a ring 72 which is removably and rotatably mounted onto base 10. The cam defining ring 72 may be selectably locked in a predetermined azimuthal orientation by means of engagement means, such as a screw 74.

The general operation of the deflector assembly 50 will now be described. Deflector assembly 50 is responsible for determining the pattern of spray and the size of the pattern. In accordance with a preferred embodiment of the present invention, the function setting dial illustrated in FIG. 7 illustrates a number of selectable patterns, being squares of different sizes and circles of different sizes, the circles of each size having a diameter equal to the diagonal across the respective squares.

When squares are selected, the engagement between the first cam surface 46 and the following surface 68 controls the disposition of the deflector 58, there being no contact between the second cam surface 48 and the following surface 66. When circles are selected, the engagement between the second cam surface 48 and the following surface 66 governs the disposition of the deflector, there being no change in the radius of the first cam surface over this range, thus maintaining pivot location 60 in a constant position. When circles are selected, the cam follower 52 is out of engagement with the pattern defining cam on surface 70. The size of the circle is determined solely by the engagement between the second cam surface 48 and the following surface 66.

When squares are selected, the cam follower 52 engages the pattern defining cam for determining the square shape. The overall size of the square is determined solely by engagement of the first cam surface 46 with the following surface 68.

It is appreciated that the orientation of the square may be selected by simple rotation of ring 72 with respect to base 10.

It is also a particular feature of the present invention that the sprinkler has means for providing coverage over only a selected portion of a circle or of a corresponding angular segment of a square defined therewithin. The apparatus for providing this function will now be described in detail. It is noted that when rotary sprinklers operate in a "zone" mode, i.e. producing less than 360 degree coverage, they produce different types of sprays as they rotate in different directions. When they operate in what shall be termed a "forward" direction, a combination long range and short range spray is produced by full range periodic deflection of a hammer like deflector, (indicated by reference numeral 40 in the present specification). When the sprinkler operates in a "return" direction, opposite to the forward direction, the amplitude of hammer deflector motion is restricted, normally producing a short range spray only.

A particularly useful type of rotary sprinkler having this feature is described and claimed in U.K. Published Patent Specification No. 2079632 of the present applicant.

The apparatus for providing "zone" mode operation of the sprinkler and for governing its operation in forward and rearward directions comprises a hammer deflector amplitude limiting element 80 which is pivotably mounted onto stem block 18, about a pivot axis 82 which is parallel to axis 12. A limiting function control finger element 84 is mounted onto stem block 18 for pivotable rotation about a pivot axis 86 which is also parallel to axis 12. Finger element 84 is coupled to limiting element 80 by means of a coil compression spring 85 which is arranged in an over center configuration so as to cause the limiting element to be maintained in an engaged orientation with an engagement portion 88 of the hammer deflector, when the finger element is in an extended orientation and to cause the limiting element to be in a disengaged orientation with engagement portion 88 when the finger element 84 is in a retracted orientation.

A pair of concentric relatively rotatable rings 90 and 92 are provided in selectably locking engagement with ring 72. These rings, which serve to define the azimuthal range of desired sprinkler operation, are provided with protrusions 94 for manual manipulation of the rings and desired positioning othereof. It is a particular feature of the present invention that the orientation of the protrusions 94 visually defines the angular boundaries of the area of sprinkler operation. Rings 90 and 92 are provided with radially inwardly facing stop members 96 and 98 respectively which operate to engage finger element 84 and to change its orientation. By changing the orientation of finger 84, the forward or return direction of operation of the sprinkler is selected as appropriate for providing back and forth motion of the sprinkler between the angular limits of azimuthal rotation defined by protrusions 94. A number of different embodiments of stop members 96 and 98 are proposed herein and will be discussed hereinbelow with reference to FIGS. 9A–11D and 12.

Figure 9A:
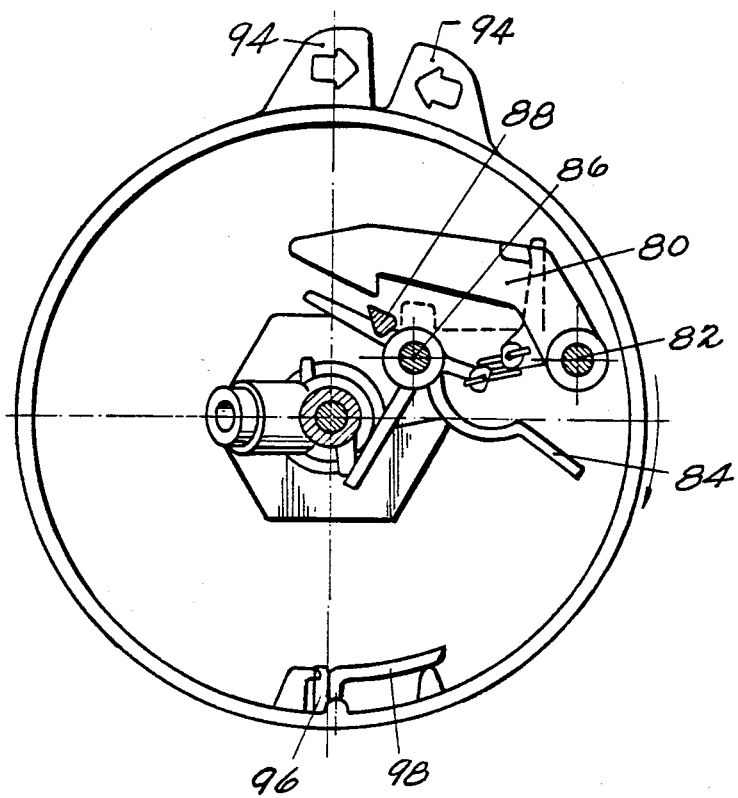
FIGS. 9A, 9B, 9C and 9D are sectional illustrations taken along a line corresponding to the line IX—IX shown on FIG. 1 of a sprinkler constructed and operative in accordance with an embodiment of the invention in a plurality of different orientations.

All of FIGS. 9A–11D are partially pictorial, partially sectional illustrations of part of the sprinkler apparatus of FIG. 1 taken generally in a plane extending horizontally through the bottom of pin 30 perpendicularly to axis 12. The embodiment shown in FIGS. 9A–9D includes two stop members 96 and 98, one of which, member 96, is fixed, while the other, member 98, is selectably positionable into or out of potential engagement with finger element 84. Selectably positionable stop member 98 may be spring biased by an external spring or by an internal spring constituted by its plastic construction and disposition in accordance with conventional teachings well known in the art, so as to adopt an at rest position in potential engagement with finger element 84 in the absence of externally applied forces. The remainder of the elements shown in FIGS. 9A–11D are indicated by the same reference numerals as used in the above description in connection with FIGS. 1–7. FIGS. 9A and 9B illustrate the sprinkler of FIG. 1 in a full circle mode of operation. Protrusions 94 are therefore shown in adjacent near registration. FIG. 9A illustrates the sprinkler operating in a forward direction indicated by the arrow, wherein amplitude limiting element 80 is in a disengaged orientation with respect to the engagement portion 88 of the hammer deflector and accordingly the finger element 84 is in a retracted orientation.

Figure 9B:
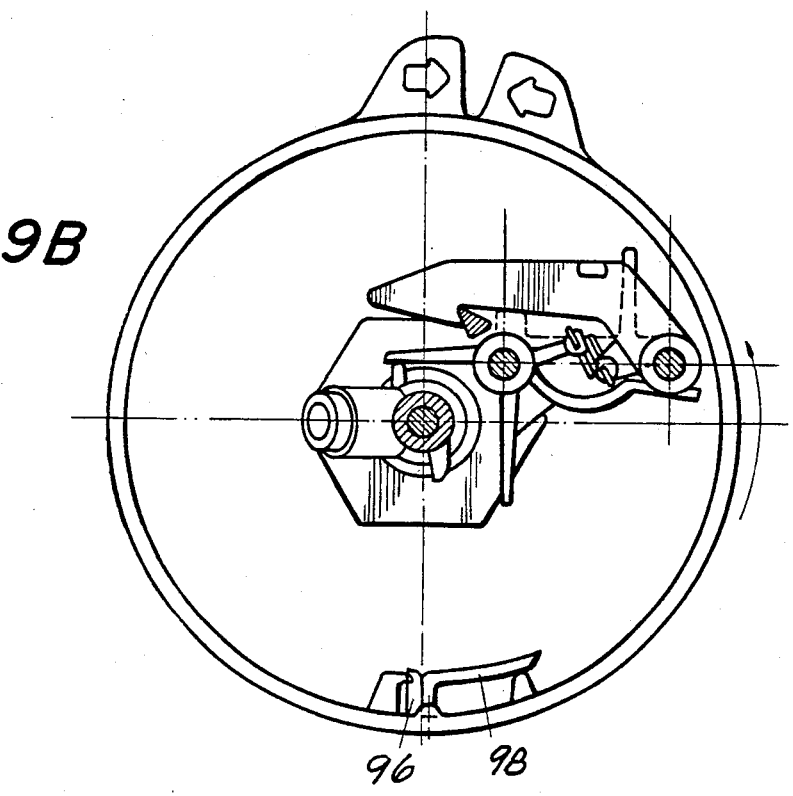

FIG. 9B illustrates operation in a return direction wherein the finger element 84 is in an extended orientation, causing amplitude limiting element 80 to engage engagement portion 88 of the hammer deflector and thus to limit its amplitude, producing return motion. It is noted that in this embodiment, the finger element 84 engages the stop member 96 and is caused to retract, thus shifting to forward direction operation. The orientation of elements shown in FIG. 9B thus occurs only when the sprinkler is shifted from zone operation to full circle operation, when the sprinkler head is oriented for return operation. It is thus appreciated that such operation in a return direction will continue only until such time as the finger element 84 engages the stop members 96 and 98, i.e. less than one full revolution. Thereafter the sprinkler will continue in forward operation, since the finger element, once retracted, will not engage the stop members 96 and 98. It is noted that in the embodiment of FIGS. 9A and 9B, selectably positionable stop member 98 is in a retracted, radially outward orientation. This is due to the fact that the two stop members are in side by side registration, stop member 96 forcing stop member 98 to assume a retracted orientation.

Figure 9C:
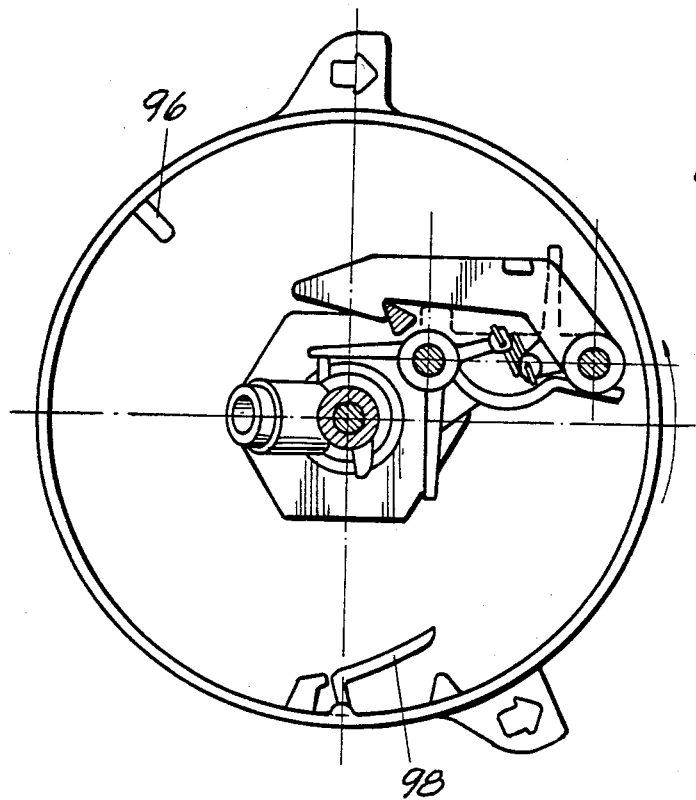
Figure 9D:
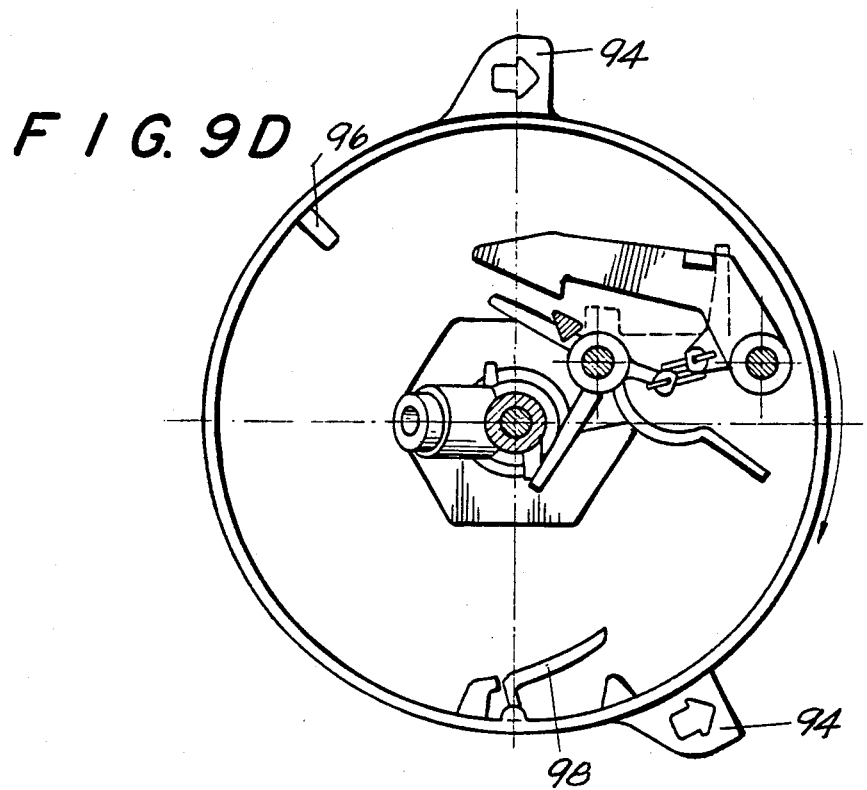

FIGS. 9C and 9D illustrate the operation of the sprinkler in a zone mode, when protrusions 94 are angularly separated from each other and indicate the zone of sprinkler coverage boundaries as extensions of the lines which connect axis 12 to the individual protrusions 94. Here, since stop member 96 does not butt up against the rear surface of stop member 98, stop member 98 is free to assume its normal, at rest, orientation, whereby it extends radially inwardly, as illustrated.

In FIG. 9C, return motion of the sprinkler is illustrated, with the limiting element 80 being in engagement with the engagement portion 88 of the hammer deflector thus limiting its amplitude and the finger element 84 being in an extended orientation. It is appreciated that the finger element 84 engages stop member 96 for limiting the zone of sprinkler coverage and changing direction.

FIG. 9D illustrates forward motion of the sprinkler, with the finger element 84 in a retracted orientation and the limiting element 80 being out of engagement with the engagement portion 88 of the hammer deflector. It is appreciated that the finger element 84 engages stop member 98 in its radially inward extended orientation.

Reference is now made to FIGS. 10A–10D in which both stop members 97 and 98 are selectably positionable and normally biased into a radially inward orientation. Thus both of the stop members 97 and 98 are similar in construction and operation to the stop member 98 illustrated in FIGS. 10A–10D and described hereinabove.

Figure 10A:
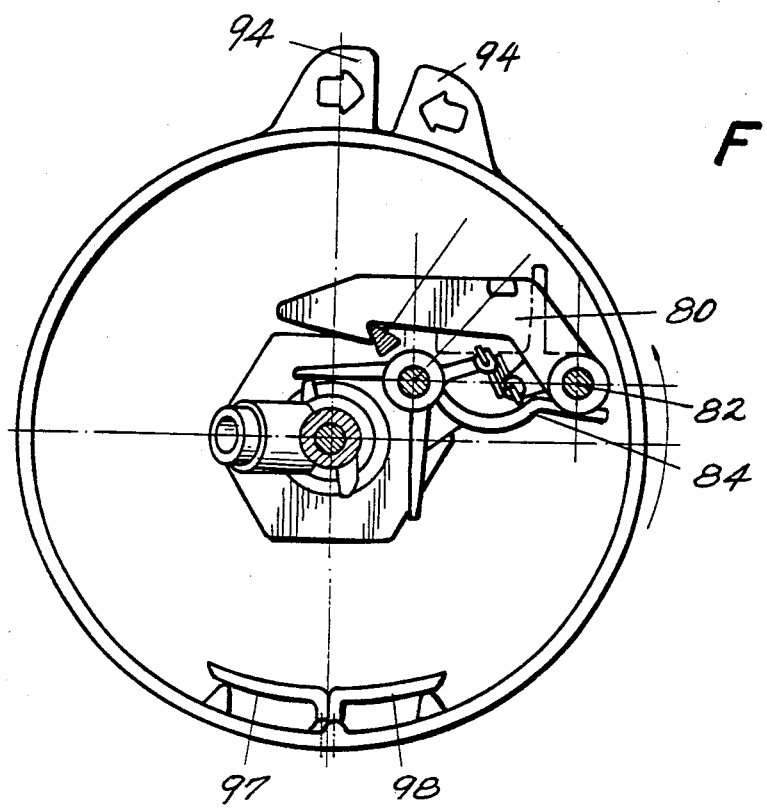
FIGS. 10A, 10B, 10C and 10D are sectional illustrations taken along a line corresponding to the line IX—IX shown on FIG. 1 of a sprinkler constructed and operative in accordance with an alternative embodiment of the invention in a plurality of different orientations.
Figure 10B:
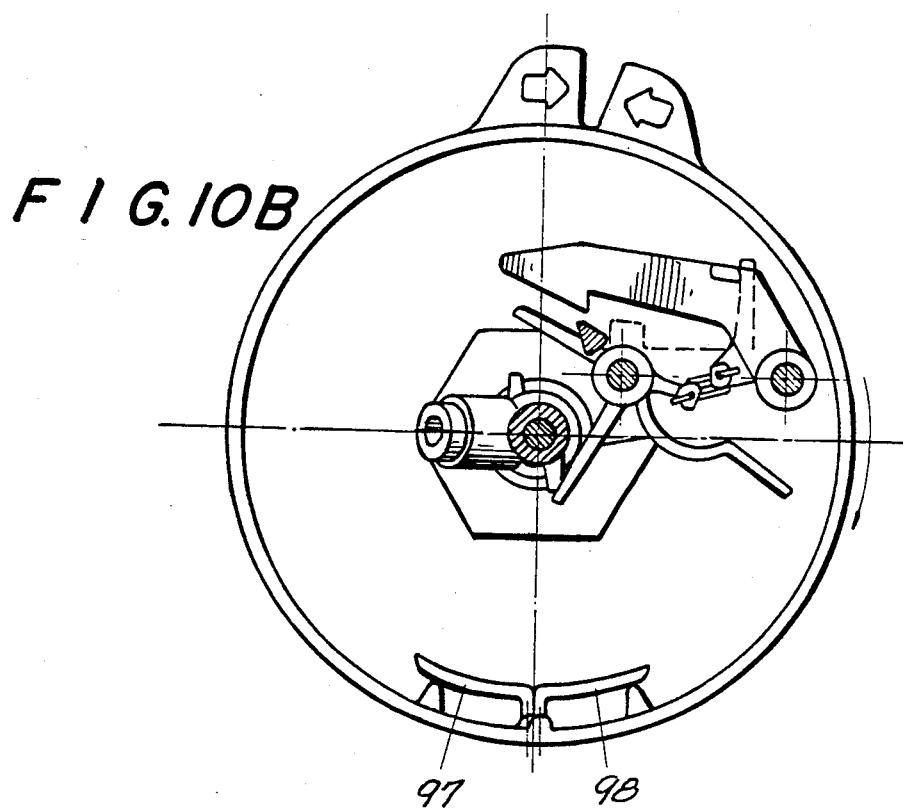

FIGS. 10A and 10B illustrate full circle operation of the sprinkler where protrusions 94 are nearly in registration. It is appreciated that they cannot be placed in complete registration due to the provision of selectably positionable stop members 97 and 98, which abut in side by side registration in the illustrated orientation. It is noted that this mutually abutting side by side registration forces both stop members 97 and 98 into their retracted radially outward orientations, as illustrated. FIG. 10A illustrates return motion wherein the finger element 84 is extended and the limiting element 80 is in engagement with the engagement portion 88 of the hammer deflector. FIG. 10A illustrates that in return motion the finger element 84 engages the stop members 97 and 98 even when they are in their retracted orientation, thus shifting the sprinkler to forward motion. Thus whenever full circle operation is indicated by side by side registration of the stop members, the sprinkler will operate in forward motion after no more than one revolution in the return direction.

FIG. 10B illustrates forward motion in a full circle mode. Here the finger element 84 is retracted and thus does not engage the stop members 97 and 98 in their retracted orientation. The sprinkler continues to operate in the full circle mode.

Figure 10C:
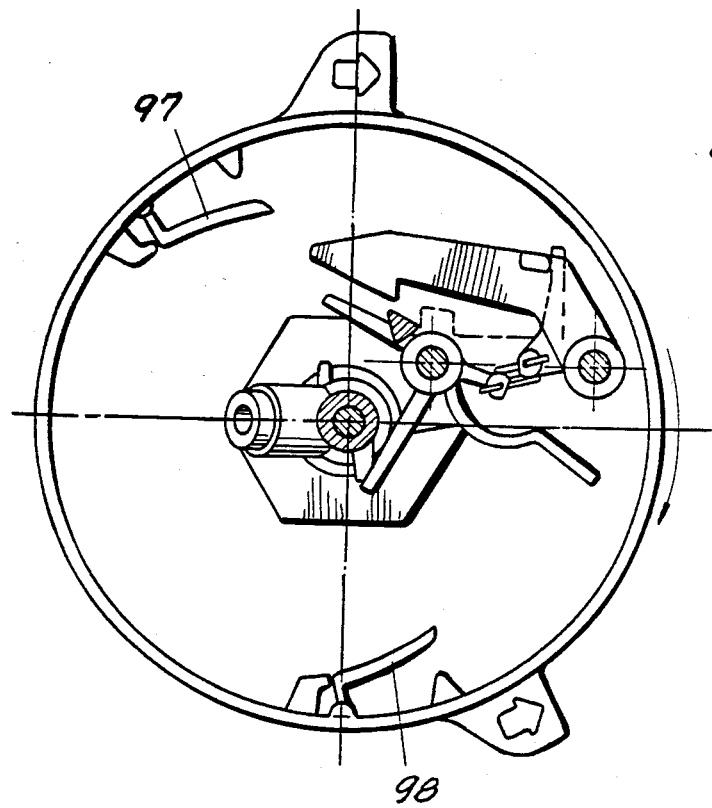
Figure 10D:
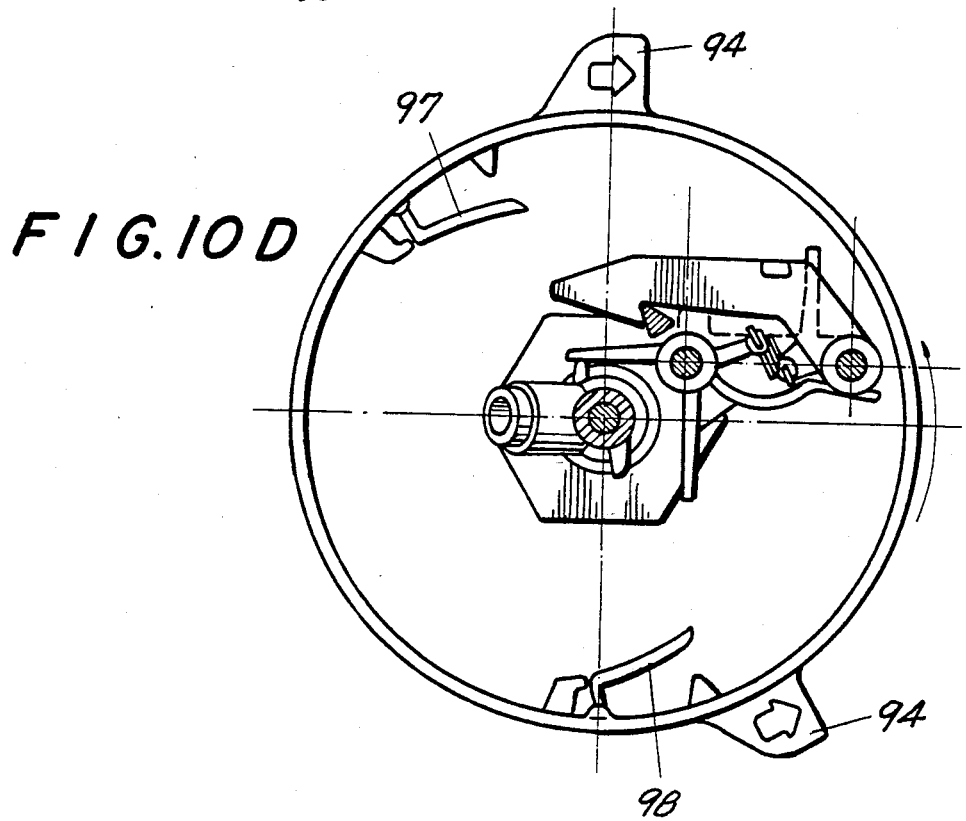

FIGS. 10C and 10D illustrate operation of the sprinkler in a zone mode, where protrusions 94 indicate the zone of coverage as described hereinabove. In FIG. 10C forward direction operation is illustrated, with the finger element 84 in a retracted orientation. Stop member 98, which is in its extended orientation, engages the finger element 84 at the zone limit defined thereby and shifts the sprinkler to return operation. FIG. 10D illustrates the return operation, where finger element 84 is extended. Stop member 97 engages the finger element 84 at the other zone limit and causes the sprinkler to shift to forward operation.

The apparatus of FIGS. 10A–10D has the advantage that it is impossible to cause operation of the sprinkler in a "forbidden" zone, i.e. the geometrical complement of the desired zone.

Reference is now made to FIGS. 11A–11D which illustrate another embodiment of the invention wherein a pair of nearly complete concentric parallel cam rings are defined on the radially inner facing surfaces of rings 90 and 92. These rings operate to force the stop members 100 and 102 into a radially inward extended orientation except when full circle mode operation is indicated by registration of protrusions 94. A side view of part of the inner surface of rings 90 and 92 is provided in FIG. 12 showing stop members 100 and 102.

It is noted that the general construction of the stop members 100 and 102 is similar to the construction of stop members 97 and 98 described above. Here, however, there is no need for spring-like biasing of the stop members into a radially inward extended orientation since the cam rings, 104 and 106, operate to force the stop members radially inwardly except when the gaps 108 and 110 in the cam rings are arranged in registration or near registration adjacent the stop members. This occurs only when full circle operation is indicated. It is noted that each of the stop members 100 and 102 engages the cam ring on the ring 90 or 92 to which it is not mounted and is also suitably positioned for desired engagement with the finger element 84.

Figure 11A:
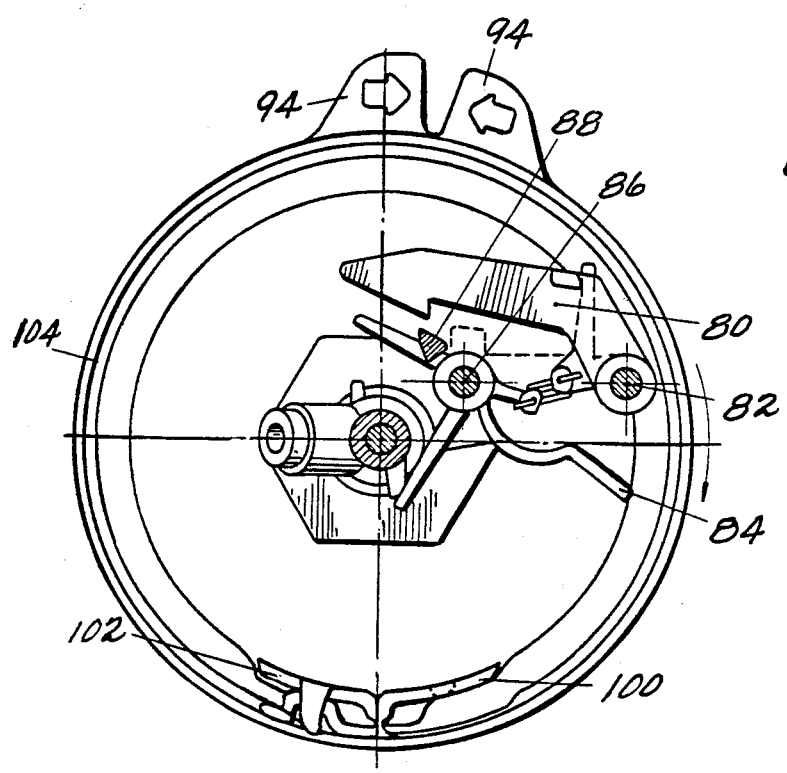
FIGS. 11A, 11B, 11C and 11D are sectional illustrations taken along a line corresponding to the line IX—IX shown on FIG. 1 of a sprinkler constructed and operative in accordance with still another embodiment of the invention in a plurality of different orientations.
Figure 11B:
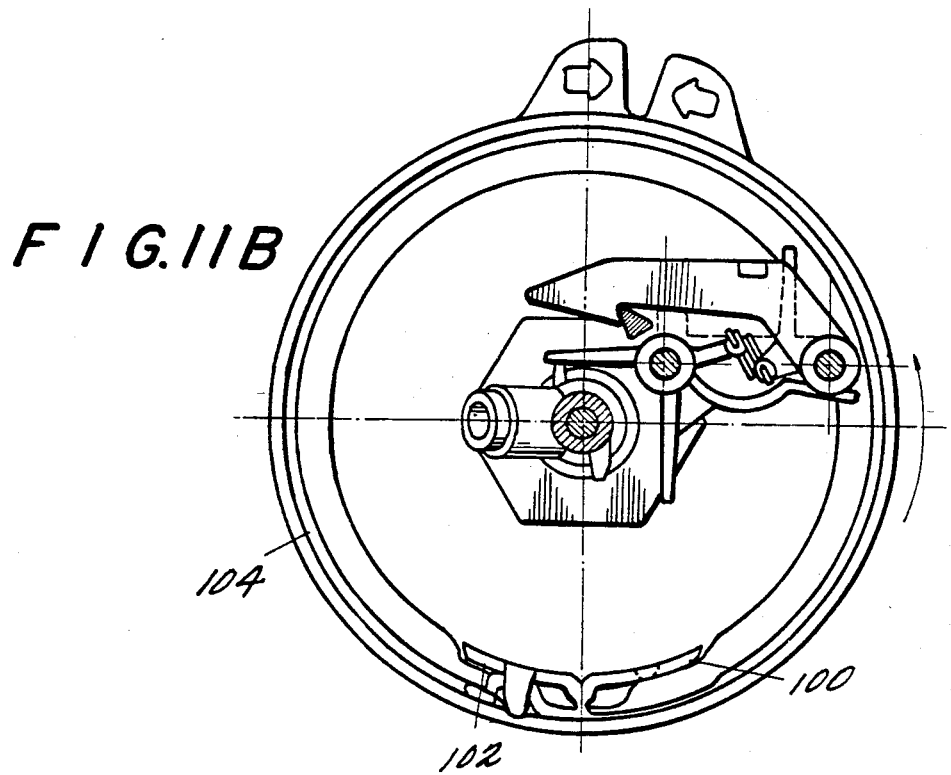
Figure 12:
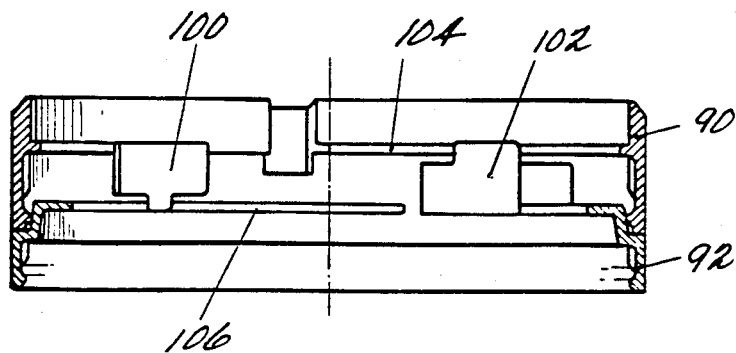
FIG. 12 is a side view illustration of the azimuth limiting apparatus also illustrated in FIGS. 11A–11D.

FIGS. 11A and 11B illustrate the sprinkler arranged for full circle mode operation. Here the gaps 108 and 110 are in registration, permitting the stop members to assume their retracted orientations, as shown. FIG. 11A illustrates forward motion, with finger element 84 in its retracted orientation and limiting element 80 out of engagement with engagement portion 88 of the hammer deflector. Forward motion may continue without any interference from the stop members as long as full circle mode operation is indicated.

FIG. 11B illustrates return motion wherein the finger element 84 is extended.

Figure 11C:
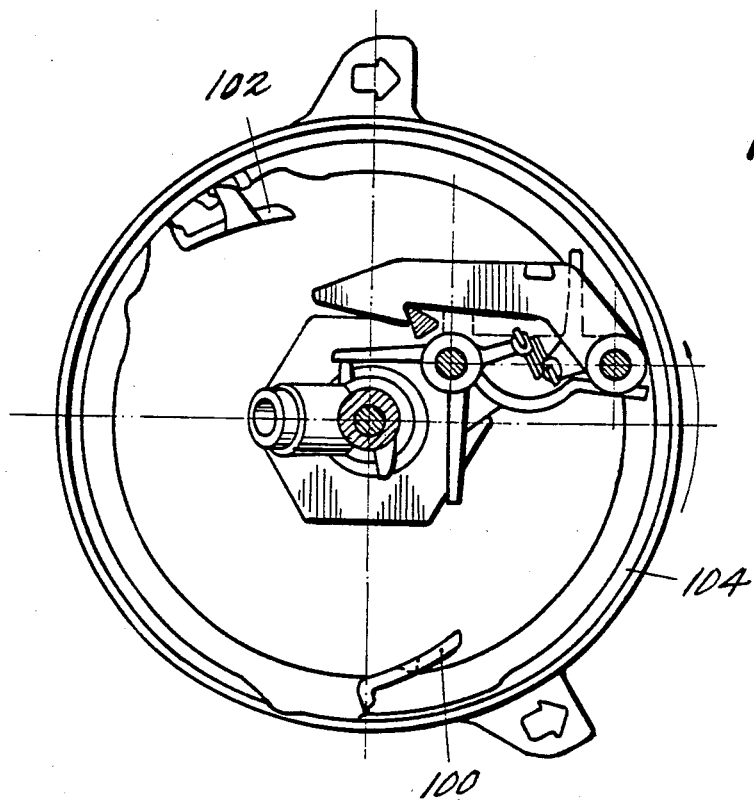
Figure 11D:
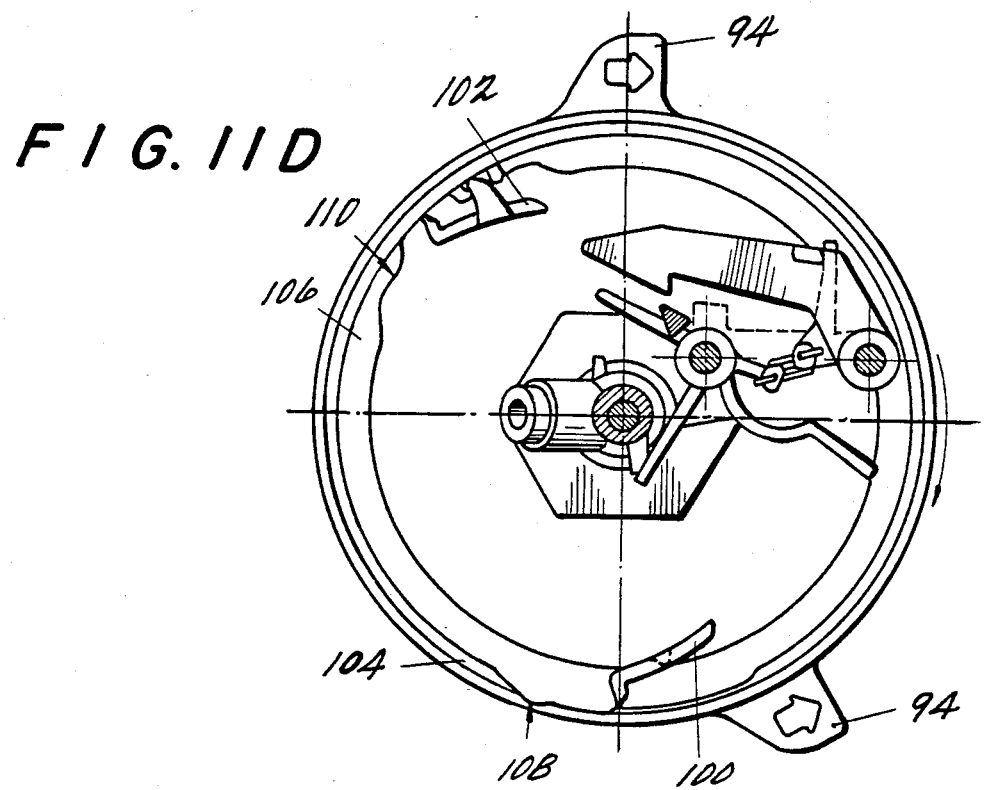

FIGS. 11C and 11D illustrate zone mode operation of the sprinkler. FIG. 11C shows return motion wherein the finger element 84 is extended and stop member 102 engages the finger element at the extreme of the intended angular range of sprinkler coverage, for shifting the sprinkler to forward motion. FIG. 11D shows forward motion of the sprinkler, with finger element 84 in a retracted orientation and limiting element 80 in a disengaged orientation with respect to engagement portion 88 of the hammer deflector. Finger element 84 engages stop member 100 which is in its extended radially inward orientation for shifting to return motion at the second extreme of the intended angular range of sprinkler coverage.

Figure 14:
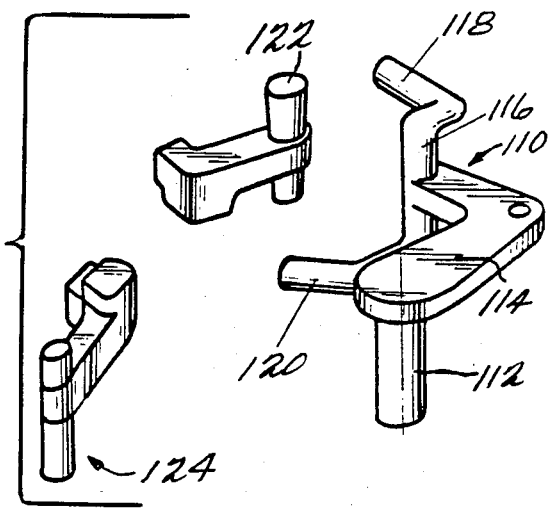
FIG. 14 is a pictorial illustration of an alternative embodiment of finger element and corresponding stop members.

Reference is now made to FIG. 14 which is a pictorial schematic illustration of an alternative embodiment of finger element 110 which may be used in place of finger element 84, described hereinabove. Finger element 110 defines a pivot poriton 112, an arm portion 114, a common vertical portion 116, which lies parallel to axis 12 (FIG. 1) and first and second engagement finger tips 118 and 120. Finger tips 118 and 120 preferably lie in different horizontal and vertical planes as defined with respect to axis 12.

The construction of finger element 110 has the particular advantage that there is no maximum limit on the size of the zone selected, i.e. the maximum may exceed 360 degrees and further that the maximum and minimum angular segment definitions are independent of the particular geometry of the stop members 122 and 124 associated therewith.

In the embodiment of FIG. 14 and also in other embodiments of the invention, constructions may be provided wherein the stop members move into and out of engagement with the finger element other than radially inward and outward. For example, the movement may be parallel to the axis of rotation of the stem of the sprinkler.

Figure 15:
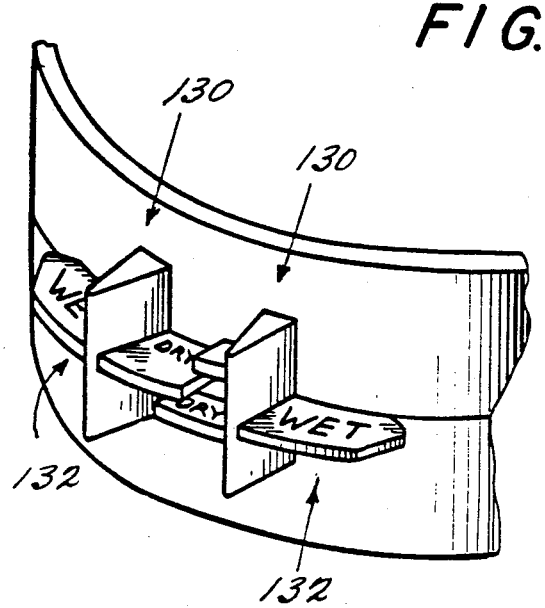
FIG. 15 is a pictorial illustration of an alternative embodiment of zone defining protrusions.

Reference is now made to FIG. 15 which is a pictorial illustration of protrusions 130 which may be used in place of protrusions 94 described hereinabove. Protrusions 130 are provided with arrows 132, typically integrally formed therewith, for indicated the zone of sprinkler coverage. The arrows may bear a written or pictorial legend thereon indicating wetness or the like.

The arrow portions bearing the written or pictorial legend may be arranged as illustrated to overlap when the protrusions are brought together thus covering one or more of the legends as appropriate during full circle operation.

Figure 16:
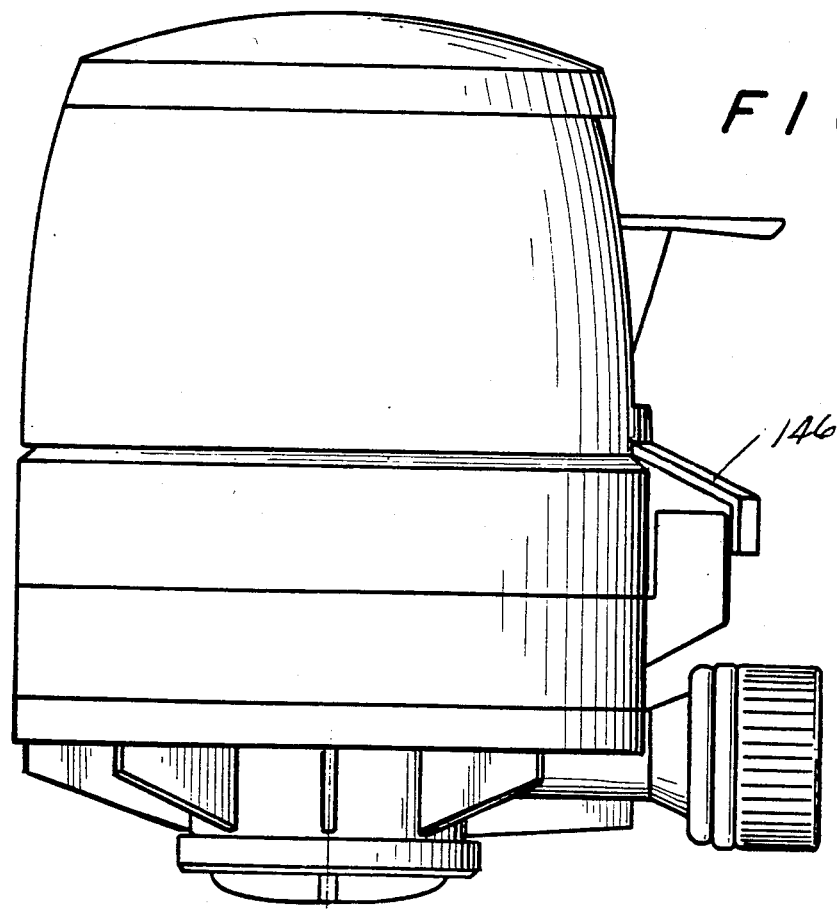
FIGS. 16, 17 and 18 are respective side, vertical sectional and horizontal sectional illustrations of a sprinkler constructed and operative in accordance with an alternative embodiment of the present invention.
Figure 17:
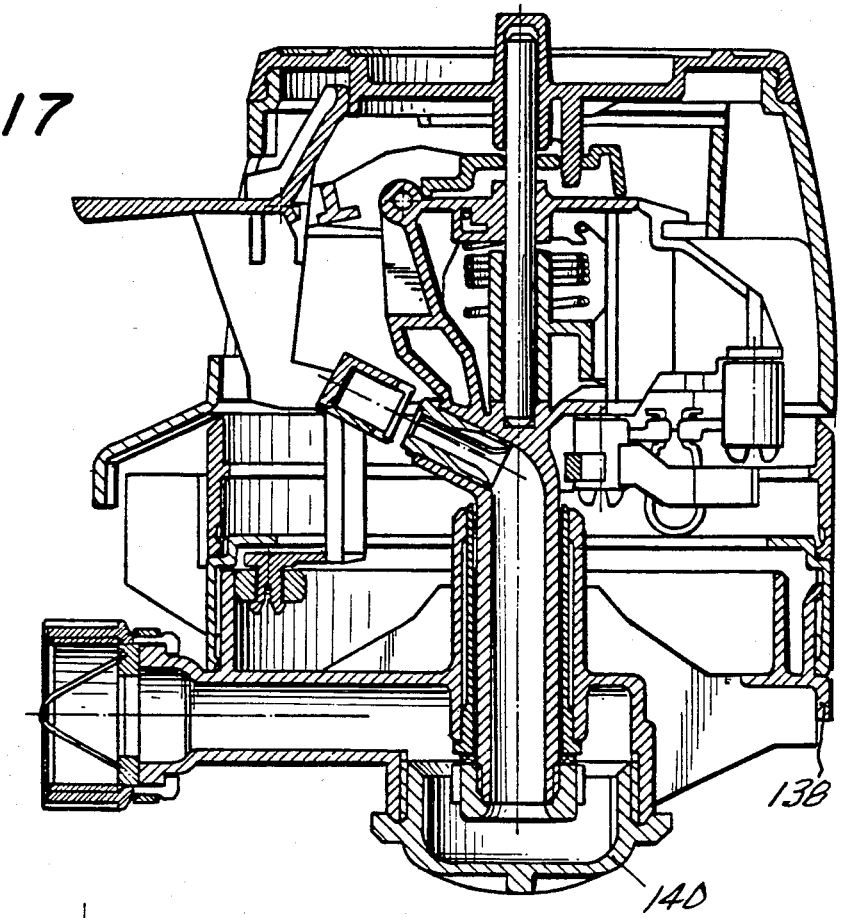
Figure 18:
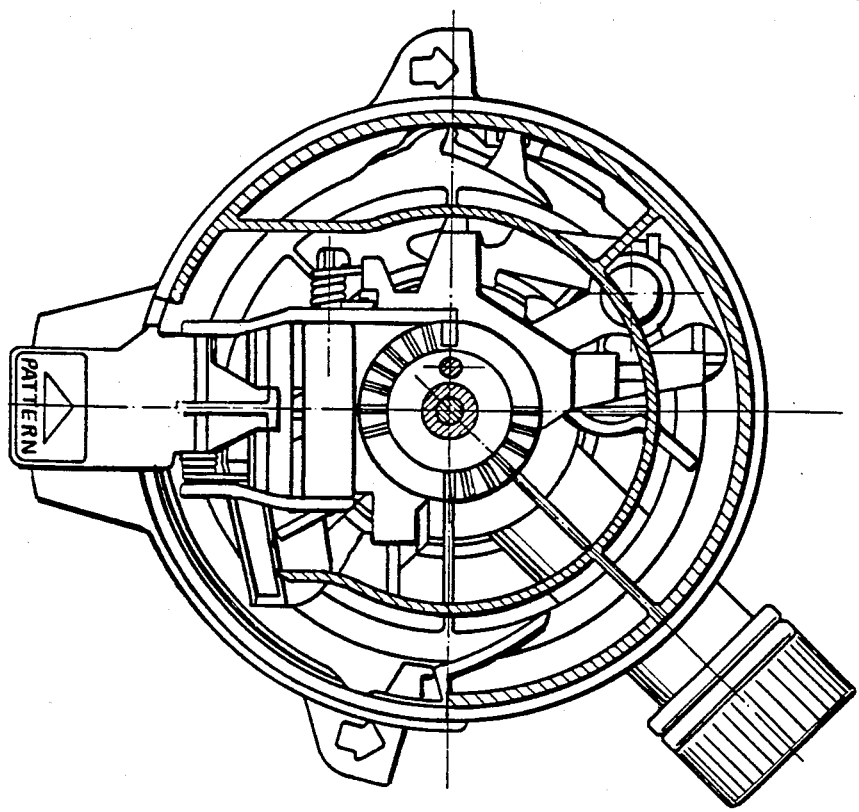

Reference is now made to FIGS. 16, 17 and 18 which are respective side, horizontal section and vertical section illustrations of a sprinkler constructed in accordance with an alternative embodiment of the present invention. The general construction of the embodiment of FIGS. 16-18 is similar to that of the sprinkler described hereinabove. Therefore specific mention will be made only of particular constructional and operational differences between the embodiments.

It is noted that here a unitary element 138 defines the base and the cam defining the sprinkler pattern configuration. A removable plug 140 is provided in registration with the central axis 12 of the sprinkler and below the water inlet of the sprinkler stem. When plug 140 is in position, the water inlet to the base is from the side as in the embodiment described hereinabove. When plug 140 is removed, a water inlet may be threadably or otherwise connected directly onto the bottom of the stem, thus providing the possibility of direct verticle pipe mounting of the sprinkler or of mounting the sprinkler onto a spike support having its own side water input and which provides a combination water connection and support coupling.

The embodiment of FIGS. 16-18 also comprises a shield 146 which is disposed directly in front of the zone setting protrusions for preventing engagement of the protrusion for conversion of the sprinkler from full circle to zone operation when the protrusions 94 lie directly in line with the sprinkler nozzle. This prevents operation of the sprinkler in an undesired zone of operation.

It will be appreciated by persons skilled in the art that the present invention is not limited to what has been particularly shown and described hereinabove. Rather the scope of the present invention is defined only by the claims which follow:

We claim:

1. A rotary sprinkler comprising:
a base;
a stem mounted on said base for rotation relative thereto, said stem having an inlet for receiving a pressurized water supply;
a water discharge nozzle mounted on said stem and being rotatable together therewith relative to said base;
water driven drive means for rotating said stem relative to said base;
sprinkling pattern determining means including
selectably positionable deflector means for engaging a stream of water emitted by said nozzle for determining the maximum radius of the stream, said deflector means including a first element movably mounted on said stem, a second element defining a water stream engaging portion and a pattern definition cam following element;
predetermined pattern definition cam means operative, in cooperation with said pattern definition cam following element, when said sprinkler is arranged for operation in a first mode of operation to modulate the position of said deflector means in accordance with the azimuthal orientation of the nozzle according to a predetermined pattern;
function selection cam means including manually engageable means for selecting the mode of operation of said sprinkler from among a first mode wherein said pattern definition cam means is operative to modulate the position of said deflector means in accordance with said predetermined pattern and a second mode wherein said pattern definition cam means is not operative to modulate the position of said deflector means.

2. A rotary sprinkler comprising:
a base;
a stem mounted on said base for rotation relative thereto, said stem having an inlet for receiving a pressurized water supply;
a water discharge nozzle mounted on said stem and being rotatable together therewith relative to said base;
water driven drive means for rotating said stem relative to said base;
sprinkling pattern determining means including
selectably positionable deflector means for engaging a stream of water emitted by said nozzle for determining the maximum radius of the stream; and
function selection cam means including manually engageable means for selecting the overall size and pattern of sprinkler stream coverage from among a first mode corresponding to non-circular pattern sprinkler coverage wherein the position of said deflector means is modulated in accordance with a predetermined non-circular pattern and a second mode, corresponding to circular pattern coverage, wherein the position of said deflector means is not so modulated.

3. A rotary sprinkler according to claim 2 and wherein said deflector means comprises a first element pivotably mounted into said stem and defining a movable pivot location and a second element defining a water stream engaging portion and a cam following portion, pivotably mounted into said movable pivot location.

4. A rotary sprinkler according to claim 1 and wherein said function selection cam means is operative to cause said cam following element in said second mode of operation to disengage from said pattern definition cam means.

5. A rotary sprinkler according to claim 1 and wherein said function selection cam means comprises first and second manually settable cam paths, said first cam path engaging said first element and said second cam path engaging said second element.

6. A rotary sprinkler according to claim 5 and wherein engagement of said second cam path with said second element prevents engagement of said cam following portion with said predetermined pattern definition cam means.

7. A rotary sprinkler according to claim 2 and wherein said function selection cam means also comprises a visually sensible dial having dial settings corresponding to predetermined patterns and pattern sizes and to predetermined cam engagements.

8. A rotary sprinkler according to claim 2 and also comprising means for selectably limiting the azimuthal range of sprinkler rotation.

9. A rotary sprinkler according to claim 8 and wherein said selectably limiting means comprise selectably displaceable stop members.

10. A rotary sprinkler according to claim 9 and wherein said selectably displaceable stop members comprise first and second relatively rotatable concentric rings mounted onto said base and having respective first and second radially inwardly directed protrusions thereon.

11. A rotary sprinkler according to claim 10 and wherein said stem comprises a limiting element for selectably limiting the amplitude of motion of said water driven drive means, thereby determining the direction of rotation of said stem with respect to said base and the type of spray produced thereby and a finger element for determining the orientation of said limiting element between limiting and non-limiting orientations.

12. A rotary sprinkler according to claim 11 and wherein said finger element has a first radially outward extended orientation when said limiting element is in a limiting orientation producing reverse sprinkler motion and has a second radially inward retracted orientation when said limiting element is in a non-limiting orientation.

13. A rotary sprinkler according to claim 12 and wherein at least one of said first and second inwardly directed protrusions has a selectable orientation with respect to said rings.

14. A rotary sprinkler according to claim 13 and wherein said at least one of said inwardly directed protrusions assumes a retracted orientation when full circle operation is indicated by the relative orientation of said concentric rings, thereby engaging said finger element only when it is in its extended orientation.

15. A rotary sprinkler according to claim 14 and wherein said at least one of said first and second inwardly directed protrusions assumes an extended orientation when zone operation is indicated by the relative orientation of said concentric rings, thereby engaging said finger element irrespective of its orientation.

16. A rotary sprinkler according to claim 10 and also comprising outwardly directed protrusions arranged on said concentric rings such that the radii passing form the rotational axis of said stem through said outwardly directed protrusions indicate the azimuthal limits of a selected zone of sprinkler coverage.

17. A rotary sprinkler according to claim 16 and wherein said outwardly directed protrusions are also provided with visually sensible indicia of which sides of the outwardly directed protrusions are within the indicated zone of sprinkler coverage.

18. A rotary sprinkler according to claim 11 and wherein said finger element comprises first and second finger tip elements arranged for engagement with respective first and second inwardly directed protrusions, said first and second finger tip elements being arranged in horizontal and vertical planes which are relatively displaced from each other.

19. A rotary sprinkler according to claim 1 and wherein said inlet for receiving a pressurized water supply is convertible from a side inlet to a bottom inlet.

20. A rotary sprinkler according to claim 2 and wherein said inlet for receiving a pressurized water supply is convertible from a side inlet to a bottom inlet.

21. A rotary sprinkler according to claim 1 and wherein said pattern definition cam means is integrally formed with said base.

22. A rotary sprinkler according to claim 2 and wherein said pattern definition cam means is integrally formed with said base.

23. A rotary sprinkler according to claim 1 and wherein said first element defines a pivot location and said cam following element is pivotably mounted onto said pivot location and
    wherein said function selection cam means includes means operative to determine the orientation of said first element and the location of said pivot location.

24. A rotary sprinkler according to claim 23 and wherein said second element and cam following elements are rigidly connected.

25. A rotary sprinkler according to claim 24 and wherein said second element and said cam following element are integrally formed.

26. A rotary sprinkler according to claim 1 and wherein said pattern definition cam means is arranged for selectable azimuthal orientation with respect to said base.

27. A rotary sprinkler according to claim 1 and wherein said function selection cam means includes means for determining the overall pattern size from among a plurality of overall pattern sizes.

28. A rotary sprinkler according to claim 2 and wherein said function selection cam means includes means for determining the overall pattern size from among a plurality of overall pattern sizes.

* * * * *